(12) United States Patent
Höller

(10) Patent No.: US 6,193,381 B1
(45) Date of Patent: Feb. 27, 2001

(54) ACTIVE MIRROR

(75) Inventor: Frank Höller, Aalen (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/272,850

(22) Filed: Mar. 19, 1999

(30) Foreign Application Priority Data

Mar. 19, 1998 (DE) .............................. 198 12 021

(51) Int. Cl.⁷ .............................. G02B 5/08; G02B 7/182
(52) U.S. Cl. .............................. 359/849; 359/224
(58) Field of Search .............................. 359/846, 847, 359/849, 224

(56) References Cited

U.S. PATENT DOCUMENTS

| | | | |
|---|---|---|---|
| 3,620,606 | * 11/1971 | Tschunko | 359/849 |
| 4,422,723 | * 12/1983 | Williams, Jr. et al. | 359/847 |
| 4,655,563 | * 4/1987 | Plante et al. | 359/849 |
| 4,657,358 | * 4/1987 | Anthony et al. | 359/845 |
| 5,016,998 | * 5/1991 | Butler et al. | 359/847 |
| 5,204,784 | 4/1993 | Spinhrine | 359/849 |

FOREIGN PATENT DOCUMENTS 35 02 024 C2   1/1985   (DE) .

* cited by examiner

*Primary Examiner*—Thong Nguyen
*Assistant Examiner*—Mark A. Robinson

(57) ABSTRACT

An active mirror has a reflectively coated diaphragm, a mount, and at least one actuator, in which a second diaphragm is connected to the mount, and the actuator is operatively connected to the two diaphragms. The active mirror is symmetrical with respect to a midplane.

20 Claims, 2 Drawing Sheets

ACTIVE MIRROR

CROSS-REFERENCES TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

This invention relates to an active mirror with a reflectively coated diaphragm, a mount, and at least one actuator.

2. Discussion of Relevant Art

Such mirrors are known, for example, from U.S. Pat. No. 5,204,784 and German Patent DE 35 02 024 C2. The known actuators specify that the actuator(s) is/are supported against rigid structures. A diaphragm is understood to be a thin, flat structure, the flexural strength of which is small as against its tensile strength, such as are provided as a deformable mirror element in the above-mentioned documents.

Such active mirrors find application, for example, as laser mirrors and as a portion of microlithography projection devices, and also, for example, in astronomical telescopes.

SUMMARY OF THE INVENTION

The invention has as its object an active mirror for the highest precision requirements, in particular as regards the constancy of the vertex position of the mirror, and thus minimizing decentering, defocusing, and tilting.

The solution is attained according to the invention by an active mirror of the given category having a reflectively coated diaphragm, a mount, a second diaphragm connected to the mount, and at least one actuator that is operatively connected to the reflectively coated diaphragm and the second diaphragm. By fastening the actuators to a second diaphragm as a support, the deformation of the reflectively coated diaphragm proceeds from an established fixed reference base.

Particularly for arrangements with several actuators, advantageous features of the invention reduce the introduction of moments or lateral thrust, which are produced by the extension or contraction of the diaphragm with a fixed support. The introduction of moments or lateral thrust are particularly minimized by the symmetry of the two diaphragms.

Ball joints that support the actuators on the two diaphragms are also an advantageous feature of the invention for undisturbed deformation, since the introduction of bending moments is prevented. Another advantageous feature of the invention is that the mount includes a pillar that is situated on the optical axis A of the active mirror and connects the reflectively coated diaphragm to the second diaphragm.

BRIEF DESCRIPTION OF THE DRAWINGS

The invention is further described in detail with reference to the drawings, in which:

FIG. 1b shows a cross section of FIG. 1a;

FIG. 2b shows a cross section of FIG. 2a.

DETAILED DESCRIPTION OF PREFERRED EMBODIMENTS

Figure 1A:
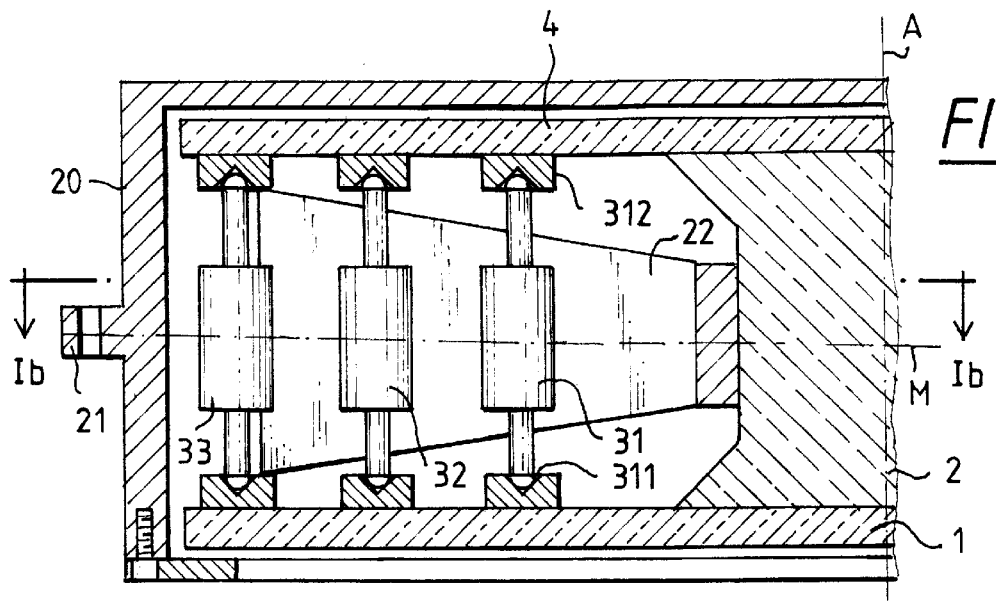
FIG. 1a shows, schematically in longitudinal section, a mirror according to the invention.
Figure 1B:
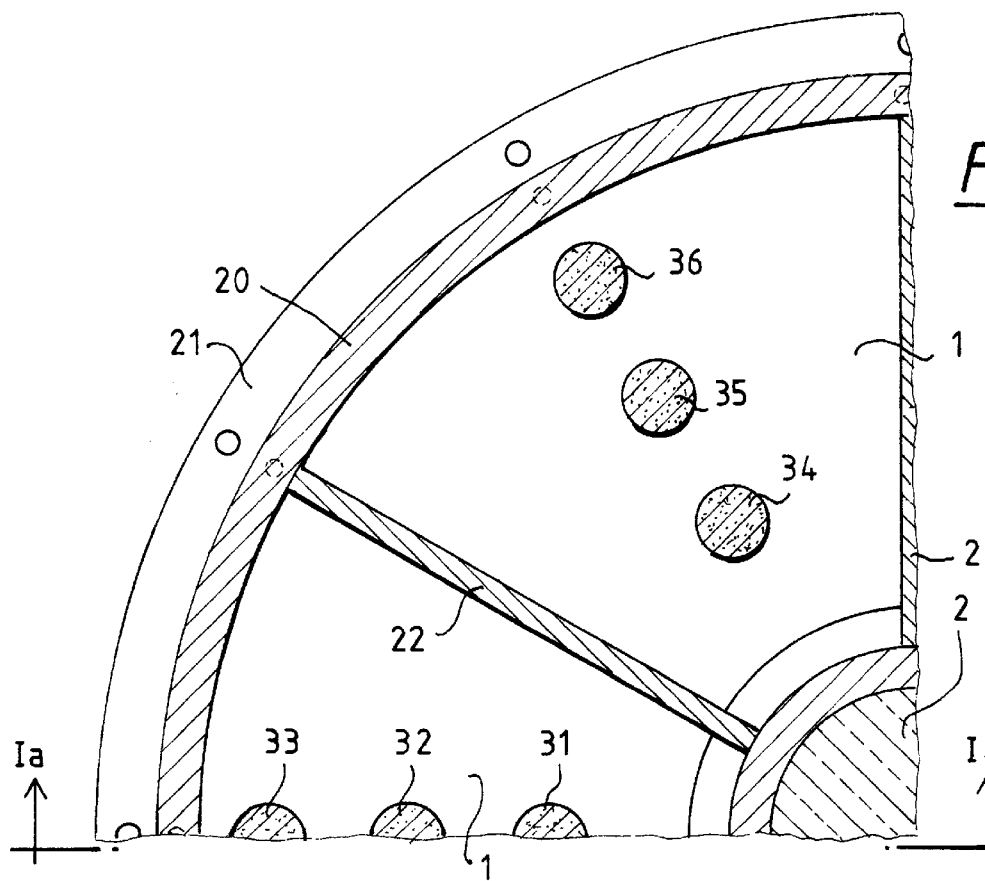

The active mirror of FIGS. 1a and 1b consists of a reflectively coated diaphragm 1 and a mount, which consists here of a central column 2 with radially arranged, outward-directed holding webs 22 and a pot-shaped protective housing 20 with a connecting flange 21. A second diaphragm 4 is arranged opposite the reflectively coated diaphragm 1. Actuators 31–36 that are respectively supported by means of ball joints 311, 312, are arranged between the two diaphragms 1, 4. The whole assembly has mirror symmetry with respect to the support plane M.

Both diaphragms 1 and 4 are like parts, usually of glass ceramic (Zerodur ®, made by Schott); the second diaphragm 4 is only lapped on the surface, while the reflectively coated diaphragm 1 is optically fine-polished and has suitable thin layers applied to it. The central column 2 of the mount is preferably also made of glass ceramic, since otherwise the effect of thermal expansion would lead to a disturbing deformation of the reflecting diaphragm 1.

Piezoelectric translators are provided as the actuators 31–36, and are proven elements with high resolution of the displacement path. They are all arranged perpendicularly to the support plane M.

If an actuator, e.g. 31–36, extends, the reflectively coated diaphragm 1 is thus curved, and the distance of the pressure point (ball joint 311) from the optical axis A has to shorten. If, as was heretofore usual, the other end were mounted with a ball joint 312 on a rigid base, a tilting of the actuator would thereby result, and thus a lateral radial force component on the reflectively coated diaphragm 1 would arise.

Since however the actuators 31–36 are supported on a likewise elastic diaphragm 4, which likewise curves, this effect is reduced, and in the illustrated case where the two diaphragms 1 and 4 have the same mechanical properties, the tilting is completely prevented, and only a parallel displacement takes place. By this arrangement, the displacement path of the actuators 31–36 indeed acts only half as a deformation of the reflecting diaphragm 1, for which, however, the resolution is doubled and the disturbing effect of thermal expansion of the actuators 31–36 is halved.

Several advantages are likewise attained by the construction of the mount with the central column 2 as a counter-support to the actuators 31–36: the position of the middle of the mirror (mirror vertex with curved mirrors) is independent of the deformation by the actuators 31–36.

The central column 2 that defines the position of the reflecting diaphragm 1 is compact and hence not susceptible to temperature gradients. A mounting ring (see FIGS. 2a/b) would, in contrast, be more easily susceptible to length differences between opposing places, due to temperature differences, and thus to tilting of the reflecting diaphragm.

The dimensions of the reflecting diaphragm 1 are, for example, 5–20 cm. diameter with a thickness of 3–10 mm. The provided displacement paths of the actuators 31–36 are of the order of magnitude between 2 and $10^2$ nanometers.

Figure 2A:
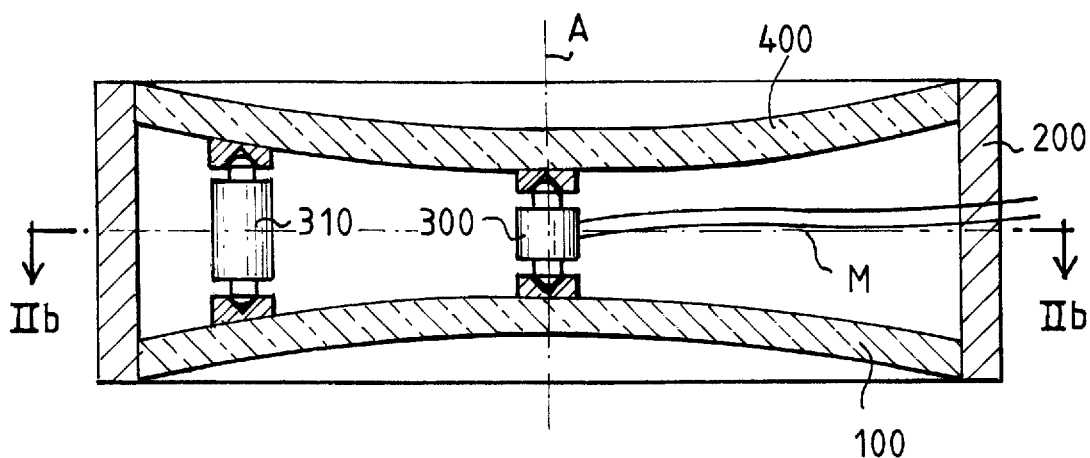
FIG. 2a shows a second embodiment, schematically in longitudinal cross section.
Figure 2B:
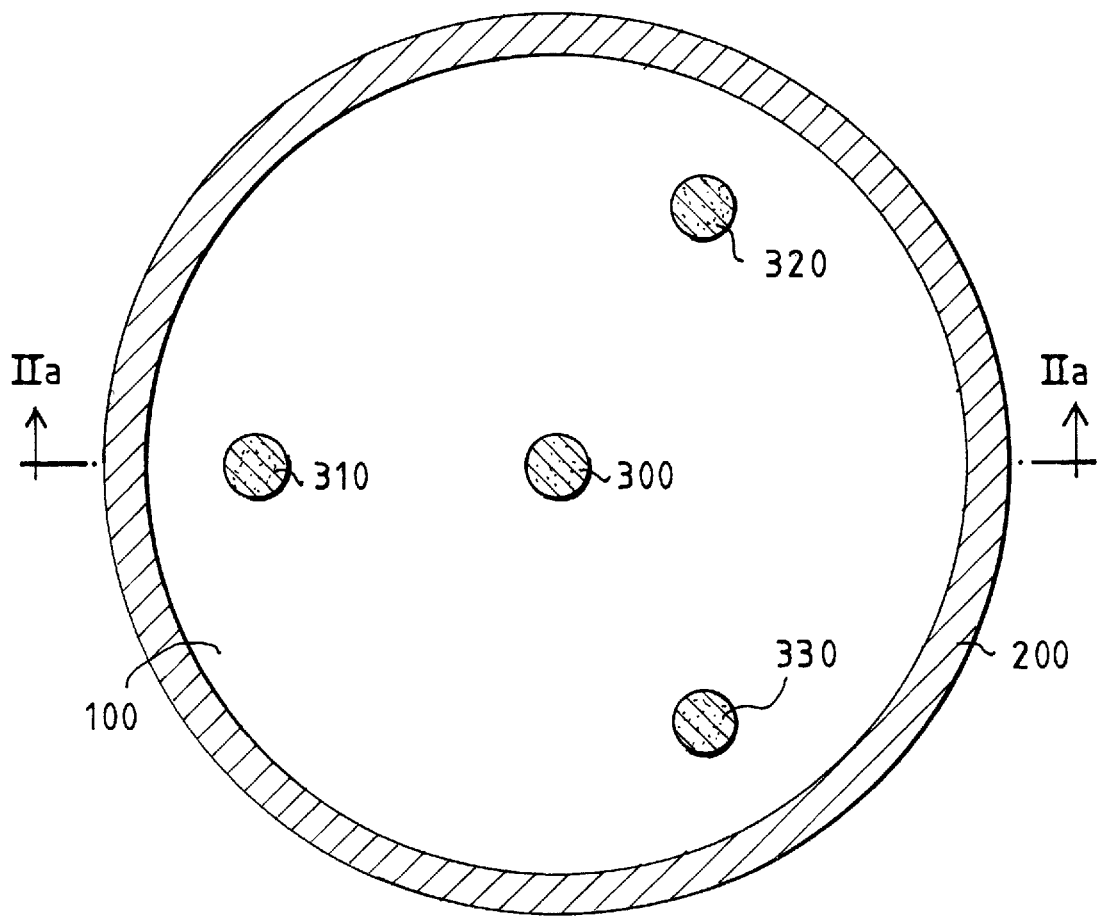

FIGS. 2a and 2b show another embodiment of the invention. The reflectively coated diaphragm 100 is embodied in this embodiment as a concave mirror, and the second diaphragm 400 is correspondingly shaped. Both are mounted at the edge to a ring 200. Here also, the support plane M is the plane of mirror symmetry.

A centrally symmetrical deformation of the reflecting diaphragm 100, the vertex of which is however then displaced axially, can already be attained in this embodiment with a single actuator situated on the optical axis A. Further actuators 310, 320, 330 are arranged, symmetrically distributed over the surface of the reflecting diaphragm 100, parallel to the optical axis A, and perpendicular to the support plane M.

It can be seen that the principle of soft support of the actuators, according to the invention, can be used for maintaining their axial direction independently of their length, for diverse mirror shapes such as are necessary in optics. The associated mounting technique is not limited to the forms, which have been described, and any known translators may also be used as actuators.

The arrangement according to the invention finds a preferred use particularly for high precision requirements at small deformations, of the order of $10^2$ nm and therebelow.

I claim:

1. An active mirror comprising:
   a reflectively coated diaphragm,
   a mount,
   a second diaphragm connected to said mount (2),
   at least one actuator operatively connected to said reflectively coated diaphragm and said second diaphragm, and at least one stiff counter support connected to said reflectively coated diaphragm and said second diaphragm.

2. The mirror according to claim 1, in which said second diaphragm has the same mechanical properties as said reflectively coated diaphragm.

3. The mirror according to claim 1, in which said second diaphragm is mirror-symmetrical to said reflectively coated diaphragm.

4. The mirror according to claim 2, in which said second diaphragm is mirror-symmetrical to said reflectively coated diaphragm.

5. The mirror according to claim 1, in which said at least one actuator is arranged perpendicular to a support plane (M).

6. The mirror according to claim 2, in which said at least one actuator is arranged perpendicular to a support plane (M).

7. The mirror according to claim 3, in which said at least one actuator is arranged perpendicular to a support plane (M).

8. The mirror according to claim 1, comprising a plurality of actuators having points of action situated on said reflectively coated diaphragm, symmetrically to the optical axis (A) of the active mirror.

9. The mirror according to claim 2, comprising a plurality of actuators having points of action situated on said reflectively coated diaphragm, symmetrically to the optical axis (A) of the active mirror.

10. The mirror according to claim 3, comprising a plurality of actuators having points of action situated on said reflectively coated diaphragm, symmetrically to the optical axis (A) of the active mirror.

11. The mirror according to claim 5, comprising a plurality of actuators having points of action situated on said reflectively coated diaphragm, symmetrically to the optical axis (A) of the active mirror.

12. The mirror according to claim 1, further comprising ball joints that support said at least one actuator on said reflectively coated diaphragm and said second diaphragm.

13. The mirror according to claim 2, further comprising ball joints that support said at least one actuator on said reflectively coated diaphragm and said second diaphragm.

14. The mirror according to claim 3, further comprising ball joints that support said at least one actuator on said reflectively coated diaphragm and said second diaphragm.

15. The mirror according to claim 5, further comprising ball joints that support said at least one actuator on said reflectively coated diaphragm and said second diaphragm.

16. The mirror according to claim 8, further comprising ball joints that support said at least one actuator on said reflectively coated diaphragm and said second diaphragm.

17. The mirror according to claim 1, in which said mount includes a pillar situated on the optical axis (A) of the active mirror with which said reflectively coated diaphragm and said second diaphragm are connected.

18. The mirror according to claim 2, in which said mount includes a pillar situated on the optical axis (A) of the active mirror with which said reflectively coated diaphragm and said second diaphragm are connected.

19. The mirror according to claim 3, in which said mount includes a pillar situated on the optical axis (A) of the active mirror with which said reflectively coated diaphragm and said second diaphragm are connected.

20. The mirror according to claim 5, in which said mount includes a pillar situated on the optical axis (A) of the active mirror with which said reflectively coated diaphragm and said second diaphragm are connected.

* * * * *